United States Patent
Barber et al.

(10) Patent No.: US 10,728,368 B2
(45) Date of Patent: Jul. 28, 2020

(54) MAINTAINING LATENCY IN TCP LOSS-INSENSITIVE CONGESTION CONTROL MECHANISMS

(71) Applicant: Cisco Technology, Inc., San Jose, CA (US)

(72) Inventors: Simon Barber, San Francisco, CA (US); Derrick Pallas, San Francisco, CA (US); Apurv Bhartia, San Mateo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 28 days.

(21) Appl. No.: 16/118,202

(22) Filed: Aug. 30, 2018

(65) Prior Publication Data
US 2020/0076926 A1     Mar. 5, 2020

(51) Int. Cl.
*G06F 11/00*       (2006.01)
*H04L 29/06*       (2006.01)
*H04L 12/801*      (2013.01)

(52) U.S. Cl.
CPC .......... *H04L 69/163* (2013.01); *H04L 47/193* (2013.01)

(58) Field of Classification Search
CPC ........................ H04L 69/163; H04L 47/193
USPC ...................... 370/235, 235.1, 230
See application file for complete search history.

(56) References Cited

U.S. PATENT DOCUMENTS

| | | | |
|---|---|---|---|
| 7,698,453 B2 | 4/2010 | Samuels et al. | |
| 8,218,443 B2 | 7/2012 | Turnbull et al. | |
| 8,717,871 B2 | 5/2014 | Yasuda | |
| 9,294,409 B2 | 3/2016 | Zhao et al. | |
| 2005/0003824 A1* | 1/2005 | Siris | H04L 47/10 455/452.1 |
| 2008/0225716 A1* | 9/2008 | Lange | H04L 41/0896 370/232 |
| 2013/0159724 A1* | 6/2013 | Kim | H04L 9/0844 713/181 |
| 2016/0156534 A1* | 6/2016 | Kawashima | H04W 24/08 370/252 |
| 2018/0183718 A1* | 6/2018 | Xie | H04L 43/0882 |

OTHER PUBLICATIONS

Cardwell et al., "BBR Congestion Control," Internet Congestion Control Research Group, Jul. 3, 2017, pp. 1-34.

* cited by examiner

*Primary Examiner* — Chuong T Ho
(74) *Attorney, Agent, or Firm* — Polsinelli PC

(57) ABSTRACT

Systems, methods, and computer-readable media for reducing latency in TCP connections that utilize loss insensitive congestion control mechanisms. In some examples, packet arrival times for one or more TCP packets of a TCP connection are analyzed and based on the analysis, it is determined whether the packet arrival times are constantly spaced over a period of time. Whether a TCP control mechanism for the TCP connection is loss insensitive is identified based on whether the packet arrival times are constantly spaced over time. If it is determined that the TCP control mechanism is loss insensitive, then a total number of acknowledgement packets transmitted during the TCP connection and associated with transmission of the one or more TCP packets in the TCP connection is reduced.

20 Claims, 10 Drawing Sheets

MAINTAINING LATENCY IN TCP LOSS-INSENSITIVE CONGESTION CONTROL MECHANISMS

TECHNICAL FIELD

The present technology pertains to reducing latency in transmission control protocol (TCP) connections, and in particular to reducing latency in TCP connections that utilize loss insensitive congestion control mechanisms.

BACKGROUND

Network connections are typically plagued by latency problems. In particular, latency created through packet dropping and retransmissions can cause bottle necks in flows that decrease network throughput and lead to poor overall performance of a network in providing network service access. This problem is further exacerbated by the fact that TCP connections typically rely on loss sensitive congestion control mechanisms for controlling packet transmission in the TCP connections.

In order to improve latency and throughput in TCP connections, loss insensitive congestion control mechanisms have been developed. Loss insensitive control mechanisms in TCP connections rely on actual congestion rather than packet loss in buffers to control how fast data is sent over the TCP connections. While TCP connection performance is improved using loss insensitive congestion control mechanisms, loss insensitive TCP congestion control mechanisms can be unnecessarily impacted by acknowledgements sent in TCP connections, e.g. 802.11 acknowledgements sent in TCP connections. There therefore exist needs for system and methods for reducing an impact of acknowledgments sent in TCP connections on TCP connections managed, at least in part, through loss insensitive control mechanisms.

Often times TCP connections are formed over different connection types, e.g. wired and wireless connections. Such connections, forming different parts of TCP connections, can operate according to their own separate communication protocols/acknowledgment protocols. Specifically, 802.11 compliant connections, herein referred to as "WiFi connections," can use specific acknowledgement protocols for transmitting data as part of transmitting packets in the TCP connection. These acknowledgement protocols can impact an overall loss insensitive congestion control mechanism of TCP connections. For example, acknowledgements sent in a WiFi connection can introduce latency and lead to retransmissions further creating even more latency over the WiFi connection. Further, as WiFi connections are inherently lossy and prone to interference, latency problems over WiFi connections are further exacerbated by acknowledgements sent in the WiFi connections. Ultimately, this can increase latency and reduce throughput over a TCP connection formed, at least in part, over the WiFi connection, thereby negating the improved performance benefits achieved by using a loss insensitive control mechanism over the TCP connection. There therefore exist needs for systems and methods for reducing impact of acknowledgment protocols used in TCP connections on latency when loss insensitive mechanisms are used to control congestion in the TCP connections.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
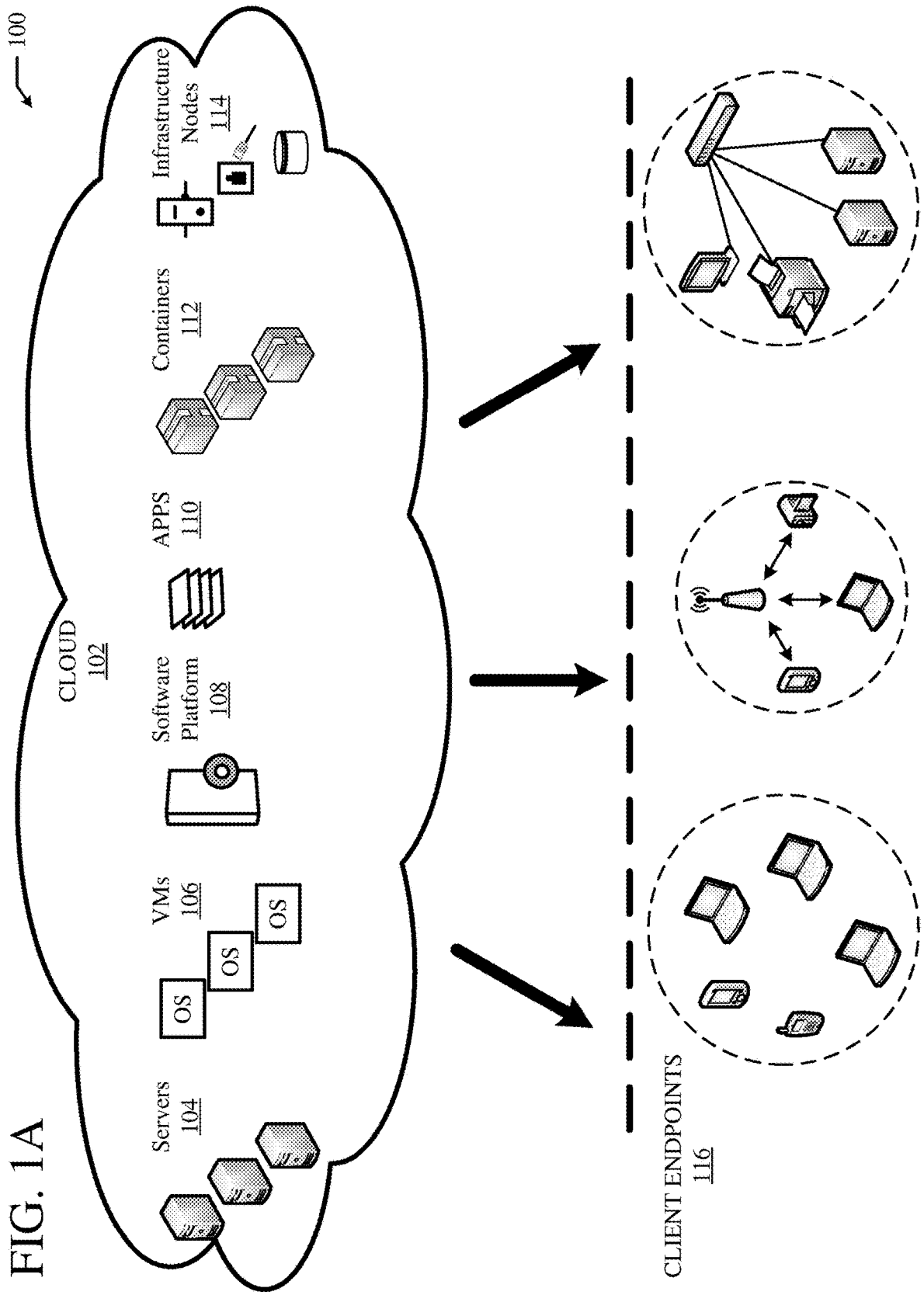
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include analyzing packet arrival times for one or more TCP packets associated with a TCP connection on one or more networks. Based on the analysis, the method can include determining whether the packet arrival times are constantly spaced over a period of time. The method can include identifying whether a TCP control mechanisms for the one or more TCP packets on the one or more networks is loss insensitive based on whether the packet arrival times are constantly spaced over the period of time. Subsequently, the method can include reducing a total number of acknowledgement packets transmitted during the TCP connection and associated with transmission of the one or more TCP packets in the TCP connection if it is determined that the TCP control mechanism is loss insensitive.

A system can analyze packet arrival times for one or more TCP packets associated with a TCP connection formed over a wired connection and a WiFi connection over one or more networks. Based on the analysis, the system can determine whether the packet arrival times are constantly spaced over the period of time. Further, the system can identify whether a TCP control mechanism for the one or more TCP packets on the one or more networks is loss insensitive based on whether the packet arrival times are constantly spaced over the period of time. The system can then reduce a total number of acknowledgement packets transmitted during the TCP connection and associated with transmission of the one or more TCP packets in the TCP connection if it is determined that the TCP control mechanism is loss insensitive.

A system can analyze packet arrival times for one or more TCP packets associated with a TCP connection in one or more networks. Further, the system can identify whether a TCP control mechanism for the one or more TCP packets on the one or more networks is loss insensitive based on the packet arrival times for the one or more TCP packets over a period of time. The system can then reduce a total number of acknowledgement packets transmitted during the TCP connection and associated with transmission of the one or more TCP packets in the TCP connection if it is determined that the TCP control mechanism is loss insensitive.

Description

The disclosed technology addresses the need in the art for mechanisms to decreasing latency and improving performance in TCP connections. The present technology involves system, methods, and computer-readable media for decreasing latency in TCP connections that utilize loss insensitive control mechanisms.

Figure 4:
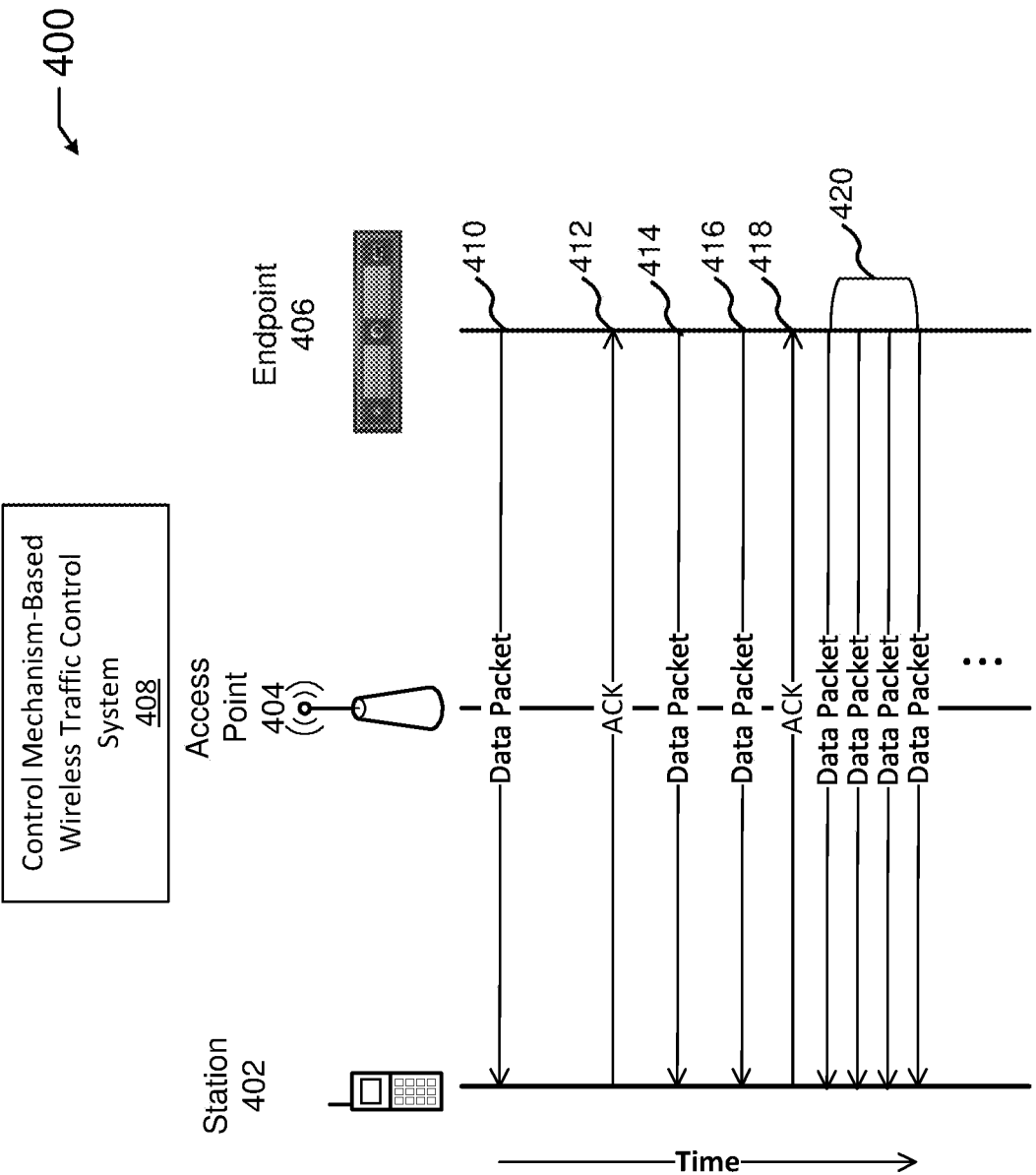
FIG. 4 illustrates a communication timing diagram of a TCP connection and a corresponding environment for supporting the TCP connection and identifying a congestion control mechanism for the TCP connection.
Figure 5:
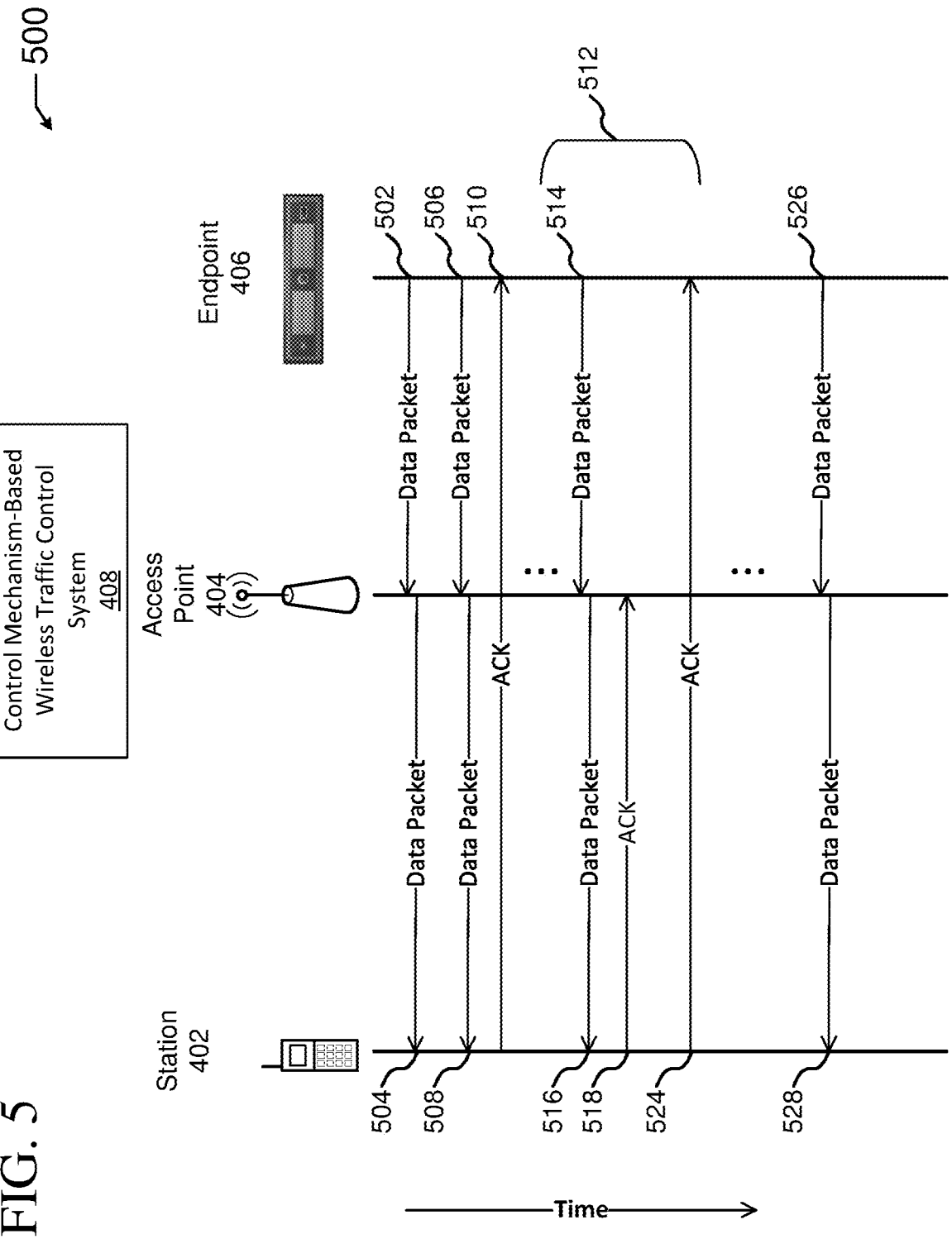
FIG. 5 illustrates a communication timing diagram for a TCP connection controlled by a loss insensitive congestion control mechanism and a corresponding environment for controlling data transmission over a wireless connection in the TCP connection based on the use of the loss insensitive control mechanism.
Figure 6:
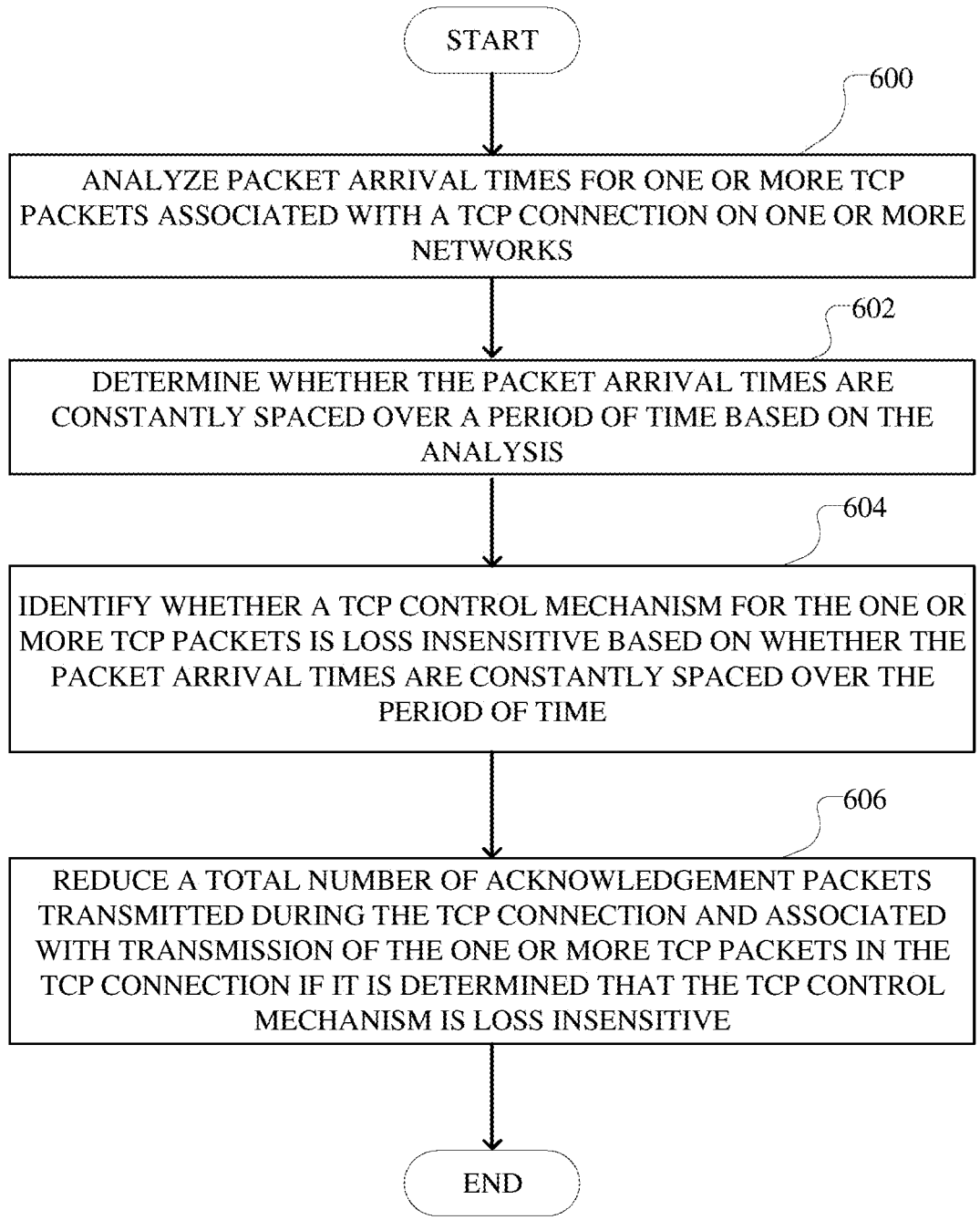
FIG. 6 illustrates a flowchart for an example method of controlling traffic to reduce acknowledgement transmission in a TCP connection based on the use of a loss insensitive control mechanism to manage the TCP connection.
Figure 7:
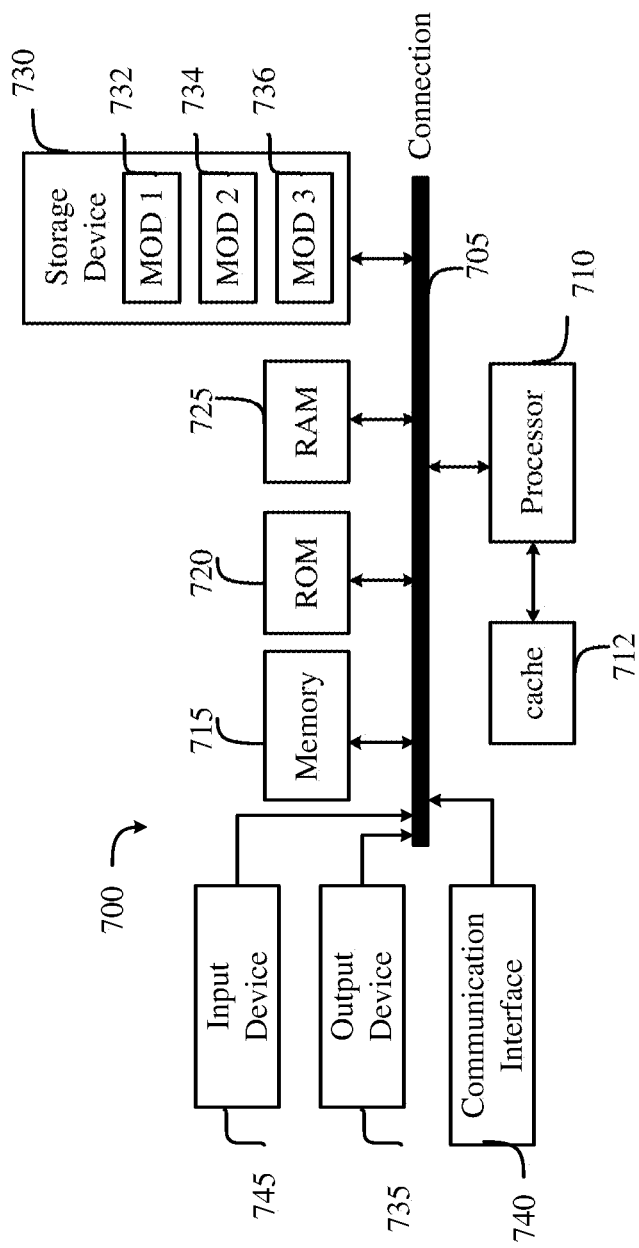
FIG. 7 illustrates an example computing system.
Figure 8:
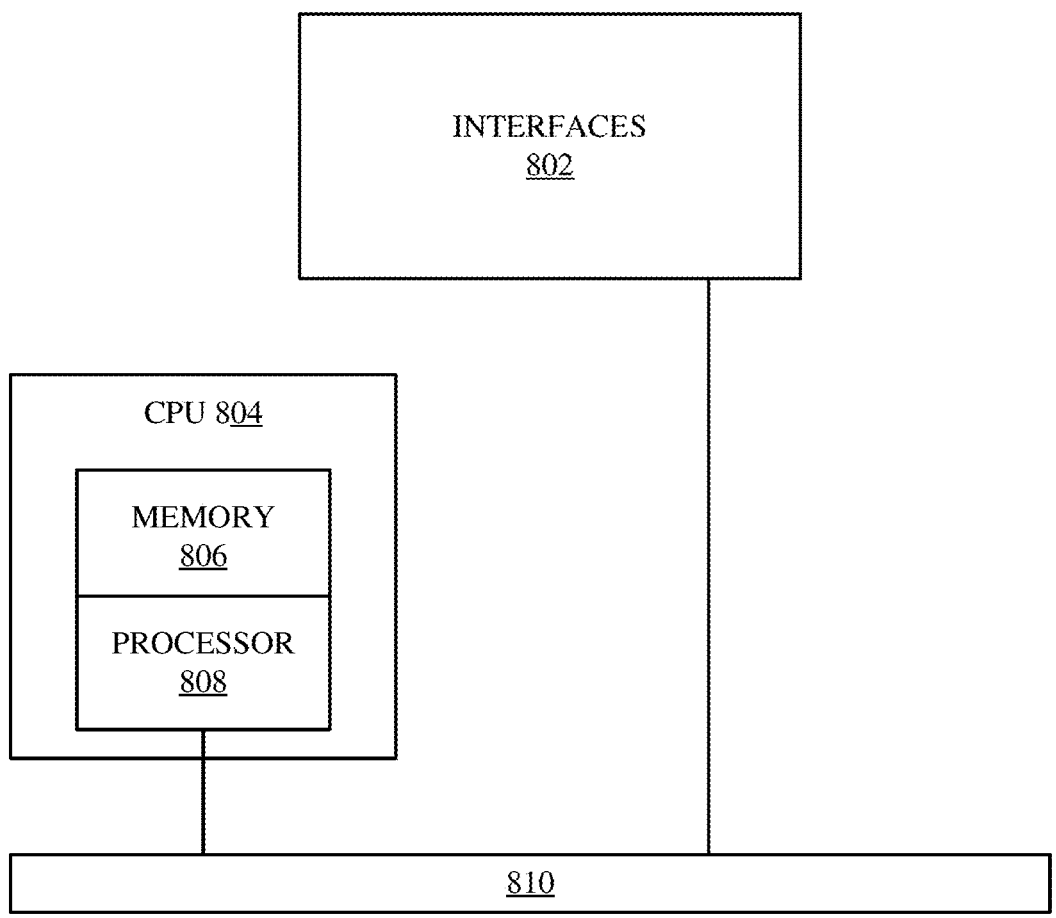
FIG. 8 illustrates an example network device.

A description of network environments and architectures for network data access and services, as illustrated in FIGS. 1A, 1B, 2A, 2B, and 3 is first disclosed herein. A discussion of systems and methods for controlling traffic in a wireless connection in a TCP connection based on a type of control mechanism used to control congestion in the TCP connection, as shown in FIGS. 4, 5, and 6, will then follow. The discussion then concludes with a brief description of example devices, as illustrated in FIGS. 7 and 8. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
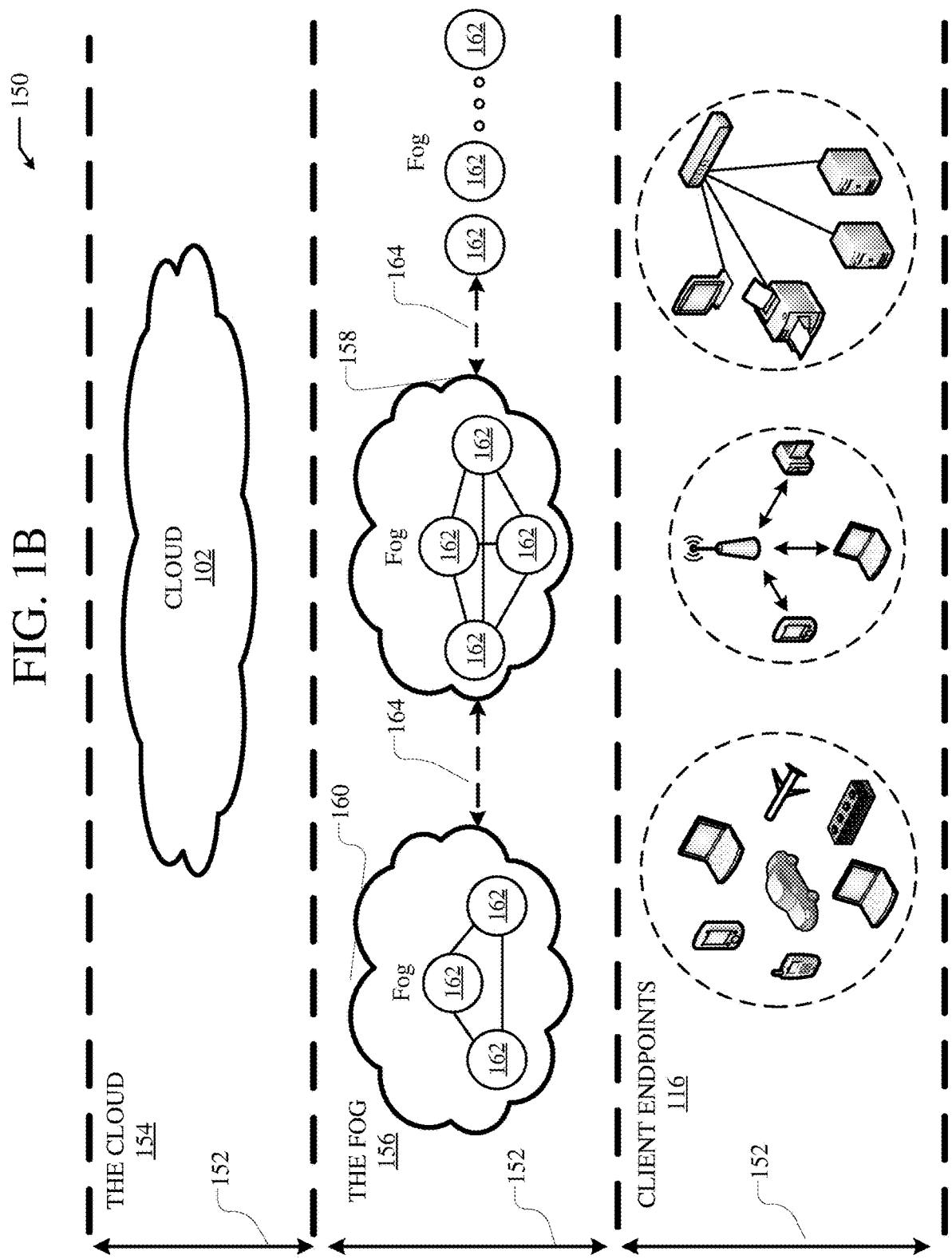
FIG. 1B illustrates an example fog computing architecture.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
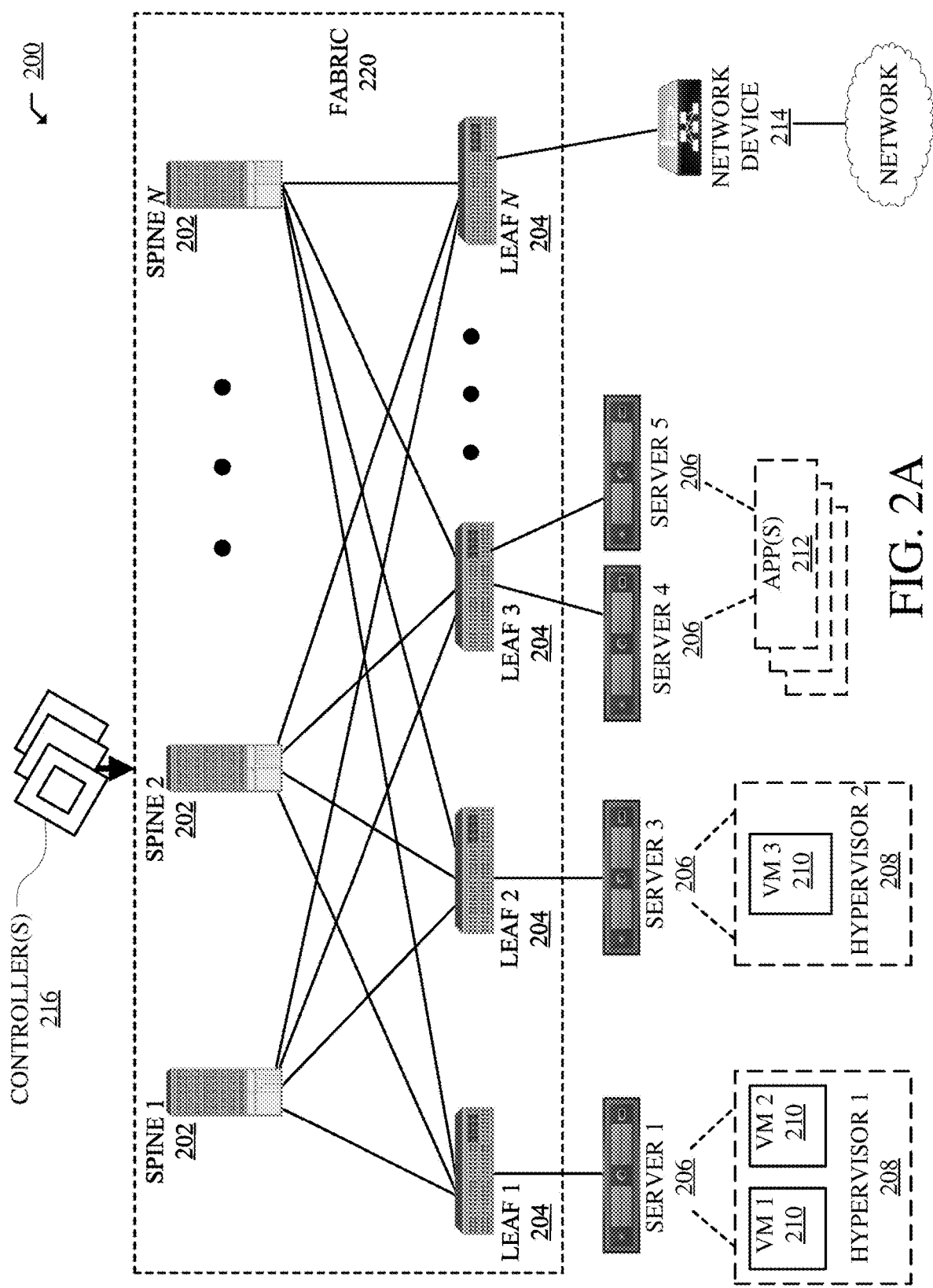
FIG. 2A illustrates a diagram of an example network environment, such as a data center.

FIG. 2A illustrates a diagram of an example Network Environment 200, such as a data center. The Network Environment 200 can be used to support a TCP connection for exchanging data between an initiator and a receiver. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
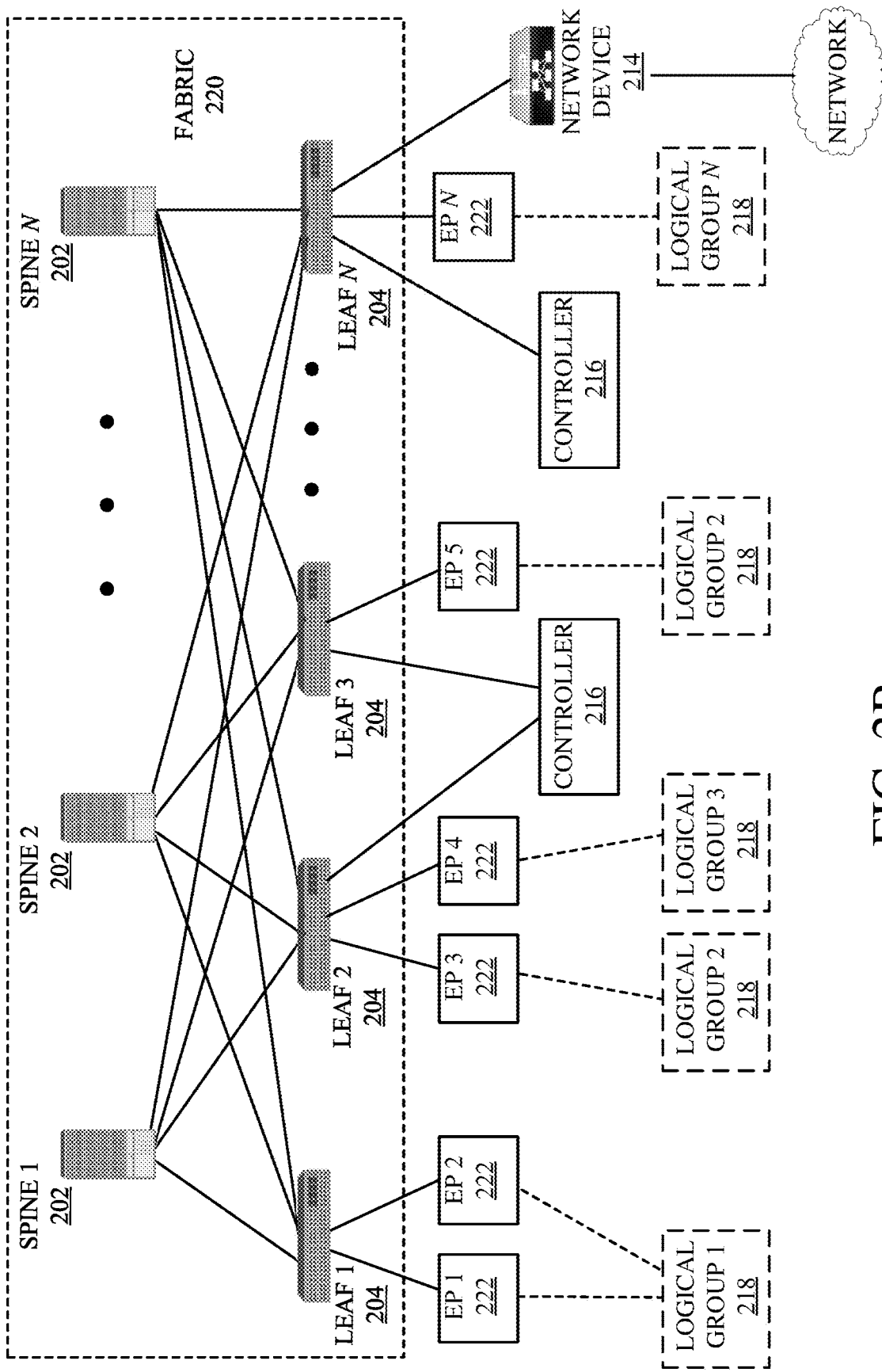
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 3:
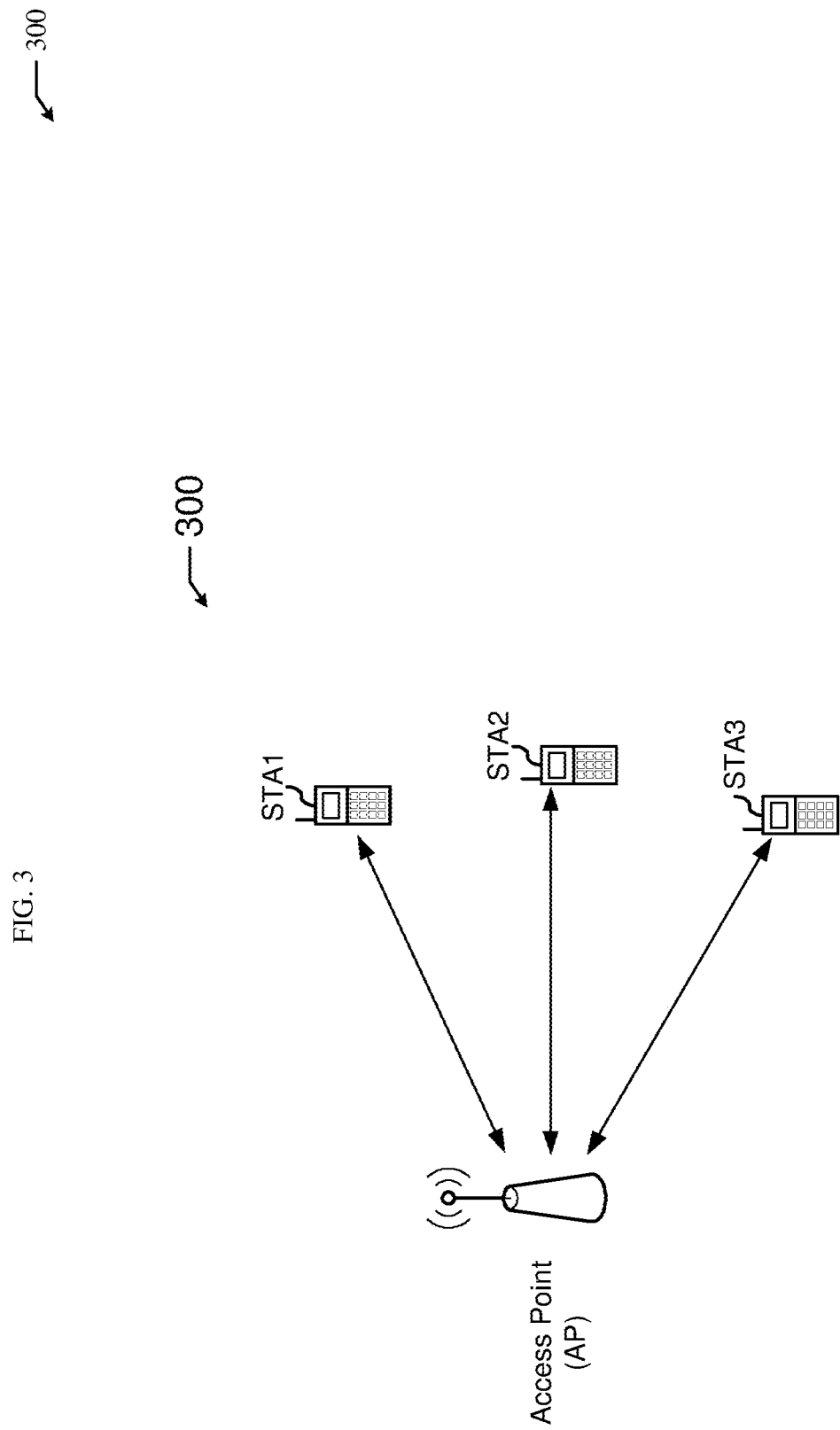
FIG. 3 illustrates an example wireless communication network in which some aspects of the technology can be implemented.

FIG. 3 illustrates an example wireless communication network 300 in which some aspects of the technology can be implemented. Specifically, the wireless communication network 300 can form, at least in part, a TCP connection and include an initiator and/or receiver in a TCP connection. Correspondingly, the wireless communication network 300 can be used to transmit data through the TCP connection.

FIG. 3 illustrates an Access Point (AP), configured for wireless communication with multiple receivers or client devices (e.g., STA1, STA2, and STA3). It is understood that additional (or fewer) STAs and/or APs could be implemented in network 300, without departing from the scope of the technology.

The AP may have access or interface to a Distribution System (DS) or another type of wired/wireless network that may carry traffic in and out of a BSS (not illustrated). Thus traffic to STAs can originate from outside the BSS, and arrive through the AP for delivery to the STAs. Conversely, traffic originating from STAs to destinations outside the BSS can be sent to the AP to be delivered to the respective destinations. Traffic between STAs within the BSS can be sent through the AP where the source STA may send traffic to the AP and the AP may deliver the traffic to the destination STA. The traffic between STAs within a BSS may be peer-to-peer traffic.

Using the IEEE 802.11 infrastructure mode of operation, the AP can transmit on a fixed channel, for example that is 20 MHz wide, and designated as the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, can sense the primary channel. If the channel is detected to be busy, the STA may back off. If the channel is detected to be free, the STA may acquire the channel and transmit data.

It is understood that network 300 can implement various wireless standards using different channel sizes (bandwidths), without departing from the technology. By way of example, IEEE 802.11n, High Throughput (HT) STAs may be used, e.g., implementing a 40 MHz communication channel. This can be achieved, for example, by combining a primary 20 MHz channel, with an adjacent 20 MHz channel to form a 40 MHz wide contiguous channel. In IEEE 802.11a/c, very high throughput (VHT) STAs can also be supported, e.g., 20 MHz, 40 MHz, 80 MHz, and/or 160 MHz wide channels. The 40 MHz, and 80 MHz, channels can be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration).

Network connections are typically plagued by latency problems. In particular, latency created through packet dropping and retransmission issues can cause bottle necks in flows that decrease network throughput and lead to poor overall performance of a network in providing network service access. This problem is further exacerbated by the fact that TCP connections typically rely on loss sensitive congestion control mechanisms for controlling packet transmission in the TCP connections.

In order to improve latency and throughput in TCP connections, loss insensitive congestion control mechanisms have been developed. Loss insensitive control mechanisms in TCP connections rely on actual congestion rather than packet loss in buffers to control how fast data is sent over the TCP connections. While TCP connection performance is improved using loss insensitive congestion control mechanisms, loss insensitive TCP congestion control mechanisms can be unnecessarily impacted by acknowledgements sent in TCP connections, e.g. 802.11 acknowledgements sent in the TCP connections. There therefore exist needs for system and methods for reducing an impact of acknowledgments sent in TCP connections on TCP connections managed, at least in part, through loss insensitive control mechanisms.

Often times TCP connections are formed over different connection types, e.g. wired and wireless connections. Such connections, forming different parts of TCP connections, can operate according to their own separate communication protocols/acknowledgment protocols. Specifically, WiFi connections use specific acknowledgement protocols, e.g. 802.11 acknowledgements, for transmitting data as part of transmitting packets in the TCP connection. These acknowledgement protocols can impact an overall loss insensitive congestion control mechanism of TCP connections. For example, 802.11 acknowledgements sent in a WiFi connection can introduce latency and lead to retransmissions further creating even more latency over the WiFi connection. Further, as WiFi connections are inherently lossy and prone to interference, latency problems over WiFi connections are further exacerbated by acknowledgements sent in the WiFi connections. Ultimately, this can increase latency and reduce throughput over a TCP connection formed, at least in part, over the WiFi connection, thereby negating the improved performance benefits achieved by using a loss insensitive control mechanism over the TCP connection. There therefore exist needs for systems and methods for reducing impact of acknowledgment protocols used in TCP connections on latency when loss insensitive mechanisms are used to control congestion in the TCP connections.

In order to address these challenges, first, it needs to be determined whether a TCP congestion control mechanism for a TCP connection is loss insensitive or loss sensitive. If it is determined that the TCP congestion control mechanism is loss insensitive, then a total number of acknowledgement packets transmitted during the TCP connection can be reduced. Specifically, a total number of acknowledgment packets transmitted in a TCP connection as part of transmitting TCP packets over a wired and a wireless connection in the TCP connection can be reduced. More specifically, transmission of acknowledgement packets over the wireless connection in the TCP connection, as part of transmitting the TCP packets over the wireless connection, can be suppressed to reduce the total number of acknowledgement packets transmitted in the TCP connection. In turn, this can reduce impacts of acknowledgement packet transmission in the TCP connection on the loss insensitive control mechanism, thereby decreasing latency and potentially increasing throughput in the TCP connection.

FIG. 4 is a communication timing diagram of a TCP connection and a corresponding environment 400 for supporting the TCP connection and identifying a congestion control mechanism for the TCP connection. The environment 400 includes a station 402, an access point 404, and an endpoint 406. The station 402 and the access point 404 can be connected as part of an applicable wireless network, such as the wireless communication network 300 shown in FIG. 3. More specifically, the station 402 and the access point 404 can be connected as part of a WiFi network. While the station 402 and the access point 404 are described herein as forming part of a WiFi network through a WiFi connection, in various embodiments, the station 402 and the access point 404 can form part of an applicable wireless network. The access point 404 and the endpoint 406 can be connected as part of an applicable wired network, such as the example network environments 200 shown in FIGS. 2A and 2B. Further, the endpoint 406 can reside or otherwise be implemented in an applicable computing architecture, such as the cloud computing architecture 100 shown in FIG. 1A or the fog computing architecture 150 shown in FIG. 1B.

Through the access point 404, the station 402 and the endpoint 406 can be connected, at least in part, through a TCP connection. More specifically, a TCP connection between the station 402 and the endpoint 406 can be formed through a wireless connection connecting the station 402 to the access point 404 and a wired connection connecting the access point 404 and the endpoint 406. Subsequently, the TCP connection between the station 402 and the endpoint 406, formed through the access point 404, can be used by the station to access network services. Specifically, the station 402 and the endpoint 406 can exchange data packets over the TCP connection through the access point 404 to provide the station 402 access to network services.

The environment shown in FIG. 4 includes a control mechanism-based wireless traffic control system 408. The control mechanism-based wireless traffic control system 408 functions, at least in part, to control traffic through the TCP connection between the station 402 and the access point 404. Specifically, the control mechanism-based wireless traffic control system 408, as will be discussed in greater detail later, can control traffic in the TCP connection between the station 402 and the access point 404 based on whether a loss sensitive or loss insensitive control mechanism is ultimately used to manage traffic congestion over the TCP connection.

The control mechanism-based wireless traffic control system 408 can be implemented at the access point 404. For example, the control mechanism-based wireless traffic control system 408 can be implemented, at least in part, at a radio/antenna of the control mechanism-based wireless traffic control system 408. Accordingly, the control mechanism-based wireless traffic control system 408 can control traffic in the TCP connection at the access point 404. For example, the control mechanism-based wireless traffic control system 408 can control traffic in the TCP connection based on packets received in the TCP connection form the endpoint 406 over the wired connection.

In controlling traffic in a TCP connection based on whether a loss insensitive control mechanism is used in the TCP connection, the control mechanism-based wireless traffic control system 408 can decrease latency and improve throughput in the TCP connection. Specifically, the control mechanism-based wireless traffic control system 408, as will be discussed in greater detail later, can reduce acknowledgement transmission over the wireless connection between the station 402 and the access point 404 based on whether a loss insensitive control mechanism is used. In turn, reducing acknowledgement transmission over the wireless connection between the station 402 and the access point 404 can decrease latency and increase throughput in the TCP connection controlled using a loss insensitive congestion control mechanism.

The control mechanism-based wireless traffic control system 408 can identify whether a TCP connection is controlled through a loss insensitive control mechanism or a loss sensitive control mechanism. A loss insensitive control mechanism, as used herein, can include an applicable congestion control mechanism that controls congestion in a TCP connection absent, at least in part, packet loss in the TCP connection. Specifically, a loss insensitive control mechanism can be a bottleneck bandwidth and round-trip propagation time ("RTT"), herein referred to as "BBR" control mechanism. While reference is made to the BBR control mechanism herein, in various embodiments, the systems, methods, and computer-readable mediums described herein are not limited to the BBR control mechanism but can also be applied to an applicable loss insensitive control mechanism.

The control mechanisms-based wireless traffic control system 408 can use an applicable mechanism or technique to identify whether a congestion control mechanism of a TCP connection is loss insensitive. Specifically, the control mechanism-based wireless traffic control system 408 can identify whether a congestion control mechanism of a TCP connection is loss insensitive based on spacing between sent data packets in the TCP connection. Specifically, the control mechanism-based wireless traffic control system 408 can identify whether a congestion control mechanism is loss insensitive based on whether packets in the TCP connection arrive at the access point 404 at constantly spaced intervals over time.

Typically, loss sensitive TCP control mechanisms control packet transmission based on packet loss. Specifically, loss sensitive TCP control mechanisms control packet transmission based on receipt of TCP acknowledgment packets for transmitted packets that are actually received at an intended recipient, e.g. based on whether the transmitted packets are actually lost or dropped. For example, a loss sensitive control mechanism can allow for a first packet to be transmitted to an intended recipient in a TCP connection. Further in the example, the loss sensitive control mechanism can refrain from sending additional packets until an acknowledgement is received from the recipient for the first packet. Subsequently, after receipt of the TCP acknowledgement, the loss sensitive control mechanism can facilitate transmission of two additional packets immediately after receipt of the TCP acknowledgment. This cycle can repeat itself, where the number of packets immediately sent after receipt of acknowledgments is increased every cycle.

Waiting to send TCP packets until acknowledgements are received, e.g. according to a loss sensitive control mechanism, increases latency in a TCP connection. Specifically, waiting to transmit additional packets until acknowledgments are received can unnecessarily delay transmission of the additional packets. This is further exacerbated when packets are dropped and have to be retransmitted, thereby drastically slowing down data transfer. In particular, TCP connections are often formed over wireless connections which are inherently lossy and susceptible to packet drops. In turn, due to packet retransmission of dropped packets, the amount of time until an acknowledgment is received increases which further delays transmission of additional packets, e.g. latency. This latency, in turn can unnecessarily impact loss insensitive control mechanisms which do not control transmission based on packet loss, e.g. control transmission based on bottleneck bandwidth and RTT.

The discussion now turns to the timing diagram shown in FIG. 4 illustrating an example timing of transmitted packets in a TCP connection controlled through a loss insensitive control mechanism. The control mechanism-based wireless traffic control system 408 can identify the TCP connection is controlled by a loss insensitive control mechanism based on the timing of transmission/receipt of the packets shown in the example timing diagram in FIG. 4. While the example timing diagram shown in FIG. 4 is made with reference to a BBR congestion control mechanism, the control mechanism-based wireless traffic control system 408 can detect whether a TCP connection is controlled by an applicable loss insensitive control mechanism. Specifically, the control mechanism-based wireless traffic control system 408 can identify whether the applicable loss insensitive control mechanism is being used based on timing of packet transmission controlled by the applicable loss insensitive control mechanism.

At 410, a first data packet is transmitted from the endpoint 406 to the station 402 through the access point 404. At 412, a first acknowledgement, indicating receipt of the first data packet, is sent from the station 402 to the endpoint 406. The first acknowledgment transmitted at 412 can be a layer 4 acknowledgement. A layer 4 acknowledgement, as used herein, is a transport layer acknowledgement indicating a packet was transmitted successfully over a TCP connection between an initiator and a receiver.

At 414, a second packet is sent from the endpoint 406 to the station 402 through the access point 404. At 416, a third packet is sent from the endpoint 406 to the station 402 through the access point 404. While transmission of the first acknowledgment 412 is shown to occur before transmission of the second packet 414 and transmission of the third packet 416, in various embodiments, the first acknowledgement can be transmitted after either transmission of the second packet 414 or transmission of the third packet 416. Specifically, the second packet can be transmitted before the acknowledgment of the first packet is transmitted from the station 402 to the endpoint 406.

Both the second packet and the third packet are transmitted at spaced intervals of time according to the BBR congestion control mechanism. Specifically, both the second packet and the third packet are transmitted at spaced intervals of time according to either or both an estimated round-trip time of packets through the TCP connection and a bandwidth or bottleneck bandwidth in the TCP connection.

For example, while not shown in the example timing diagram in FIG. 4, the second packet can be transmitted at 414 immediately after the first packet is transmitted at 410, e.g. after the round-trip time of packets in the TCP connection is estimated. Further in the example, the third packet can be transmitted at a time of half of the estimated round-trip time after the second packet is transmitted at 414. Accordingly, the second packet and the third packet are transmitted at spaced intervals, e.g. based on an estimated round trip time of packets in the TCP connection.

The control mechanism-based wireless traffic control system 408 can identify that the BBR congestion control mechanism is used in the TCP connection based on the arrival times of one or a combination of the first packet, the second packet, and the third packet. Specifically, the control mechanism-based wireless traffic control system 408 can identify BBR is used in the TCP connection based on the arrival times of one or a combination of the first packet, the second packet, and the third packet at the access point 404. More specifically, the control mechanism-based wireless traffic control system 408 can identify BBR is used in the TCP connection based on the first packet, the second packet, and the third packet as they are transmitted over the wired connection between the endpoint 406 and the access point 404. Based on the identified arrival times of the first packet, the second packet, and the third packet, the control mechanism-based wireless traffic control system 408 can identify that the packets are transmitted over spaced intervals, e.g. constantly spaced intervals, which can subsequently indicate that BBR is being used in the TCP connection. This is in contrast to traditional loss sensitive control mechanisms that transmit packets together at varying intervals based on acknowledgement receipt. Accordingly, the control mechanism-based wireless traffic control system 408 can identify whether BBR is utilized in the TCP connection based on spacing of packet transmissions in the TCP connection, e.g. as indicated by packet arrival times at the access point 404.

The control mechanism-based wireless traffic control system 408 can identify whether BBR is used as a control mechanism in the TCP connection at the start of the TCP flow in the TCP connection. Specifically, transmission of the first packet, the second packet, and the third packet can form, at least in part, the start of the flow in the TCP connection. Accordingly, by identifying whether BBR is used in the TCP connection based on transmission of one or a combination of the first packet, the second packet, and the third packet, the control mechanism-based wireless traffic control system 408 can identify whether BBR is used in the TCP connection at the start of the TCP flow in the TCP connection.

Returning back to the example timing diagram shown in FIG. 4, at 418, a second acknowledgment is transmitted from the station 402 to the endpoint 406. The second acknowledgment can correspond to receipt of the second packet transmitted at 414. Further the second acknowledgment can be a layer 4 acknowledgment. While the second acknowledgment is shown as being transmitted after the second and third data packets are transmitted, in various embodiments, the second acknowledgment can be transmitted between transmission of the second data packet at 414 and transmission of the third data packet at 416.

A fourth data packet, a fifth data packet, a sixth data packet, and a seventh data packet can be transmitted at 420 from the endpoint 406 to the station 402. The fourth, fifth, sixth, and seventh data packets can be transmitted at spaced intervals of time according to the BBR congestion control mechanism. Specifically, the fourth, fifth, sixth and seventh data packets can be transmitted at spaced intervals of time according to either or both an estimated round-trip time of packets through the TCP connection and a bandwidth or bottleneck bandwidth in the TCP connection. For example, each of the packets transmitted at 420 can be transmitted at spaced intervals of a quarter round-trip time of the estimated round trip time according to the BBR congestion control mechanism. Further, while the packets are shown as being transmitted after the second acknowledgment is transmitted at 418, in various embodiments, one or a combination of the fourth, fifth, sixth, and seventh data packets can be transmitted before the second acknowledgment packet is transmitted.

The control mechanism-based wireless traffic control system 408 can identify that the BBR congestion control mechanism is used in the TCP connection based on the arrival times of one or a combination of the fourth packet, the fifth packet, the sixth packet, and the seventh packet. Specifically, the control mechanism-based wireless traffic control system 408 can identify BBR is used in the TCP connection based on the arrival times of one or a combination of the fourth packet, the fifth packet, the sixth packet, and the seventh packet at the access point 404. Based on the identified arrival times of the fourth packet, the fifth packet, the sixth packet, and the seventh packet, the control mechanism-based wireless traffic control system 408 can identify that the packets are transmitted over spaced intervals, e.g. constantly spaced intervals, which can subsequently indicate that BBR is being used in the TCP connection.

Further, the control mechanism-based wireless traffic control system 408 can identify whether BBR is used as a control mechanism in the TCP connection while the TCP flow in the TCP connection is in progress. Specifically, transmission of the fourth packet, the fifth packet, the sixth packet, and the seventh packet can occur as the flow in the TCP connection is in progress. Accordingly, by identifying whether BBR is used in the TCP connection based on transmission of one or a combination of the fourth packet, the fifth packet, the sixth packet, and the seventh packet, the control mechanism-based wireless traffic control system 408 can identify whether BBR is used in the TCP connection as the TCP flow is in progress.

While the control mechanism-based wireless traffic control system 408 is shown to identify a congestion control mechanism of the TCP connection from traffic originating at the endpoint 406 and transmitted to the station 402, in various embodiments, the control mechanism-based wireless traffic control system 408 can identify a congestion control mechanism from traffic originating at the station 402 and transmitted to the endpoint 406. Specifically, the control mechanism-based wireless traffic control system 408 can identify a congestion control mechanism based on arrival times of traffic originating at the station 402 and received at the access point 404 over the wireless, e.g. WiFi, connection.

FIG. 5 is a communication timing diagram for a TCP connection controlled by a loss insensitive congestion control mechanism and a corresponding environment 500 for controlling data transmission over a wireless connection in the TCP connection based on the use of the loss insensitive control mechanism. The environment 500 includes the station 402, the access point 404, and the endpoint 406. The environment 500 also includes the control mechanism-based wireless traffic control system 408.

The TCP connection in the environment 500 and represented by the corresponding timing diagram shown in FIG. 5 is controlled by a loss insensitive congestion control mechanism, specifically the BBR control mechanism. The control mechanism-based wireless traffic control system 408 can identify that the TCP connection is controlled by BBR using an applicable method. More specifically, the control mechanism-based wireless traffic control system 408 can identify that the TCP connection is controlled by BBR based on packet arrival times at the access point 404, as is discussed with respect to FIG. 4.

The control mechanism-based wireless traffic control system 408 can manage transmission of data over the wireless connection between the station 402 and the access point 404 based on the identification that the TCP connection is managed using a loss insensitive control mechanism, hereafter discussed with respect to BBR. Specifically, the control mechanism-based wireless traffic control system 408 can reduce a number of acknowledgement packets sent over the wireless connection between the station 402 and the access point 404 as part of transmitting data through the TCP connection. In turn, this can reduce a total number of acknowledgement packets transmitted during the TCP connection leading to decreased latency and improved throughput in the TCP connection. The control mechanism-based wireless traffic control system 408 can reduce a total number of acknowledgment packets transmitted during the TCP connection with respect to all acknowledgments typically transmitted over a TCP connection across both wired and wireless connections.

The control mechanism-based wireless traffic control system 408 can use acknowledgment suppression, e.g. 802.11 acknowledgement suppression, to stop, at least in part, transmission of acknowledgments across the wireless connection between the station 402 and the access point 404. This is shown in the timing diagram of FIG. 5. Specifically, at 502, a data packet is sent from the endpoint 406 to the access point 404. The control mechanism-based wireless traffic control system 408 can enable acknowledgment suppression, e.g. based on BBR controlling the TCP connection, and at 504, the access point 404 can send the data packet to the station 402. Specifically, the control mechanism-based wireless traffic control system 408 can turn on the NO-ACK bit in the packet transmitted at 504. At 506, the endpoint can send another data packet to the access point 404. As acknowledgement suppression is enabled, the access point 404 does not have to receive a layer 2 acknowledgment from the station 402 for the data packet transmitted at 504 before transmitting the data packet received at 506. Instead the access point 404 can simply transmit the data packet to the station 402, at 508, once the data packet is received at the access point 404 at 506.

A layer 2 acknowledgement, as used herein, is a data link layer acknowledgement indicating a packet was transmitted successfully over a wireless connection between a station and an access point/a wireless initiator and a wireless receiver. By limiting the number of layer 2 acknowledgments or otherwise eliminating, at least in part, the reliance on layer 2 acknowledgements to transmit packets, latency and throughput in a TCP connection can be improved. Specifically, data can be transferred faster from the access point 404 to the station 402, as the access point 404 no longer needs to wait for a layer 2 acknowledgment before sending the next packet in the TCP connection. Further, eliminating use of layer 2 acknowledgements over the wireless connection can remove the need to retransmit dropped packets, e.g. because dropped packets are not discovered without layer 2 acknowledgements. This is aligned with BBR as BBR is not concerned with congestion control based on packet loss. In turn, packet re-ordering due to retransmission of dropped packets is negated, thereby allowing for formation of larger or maximum-sized packet aggregates. Ultimately, increasing packet aggregates can allow data to be sent faster between the access point 404 and the station 402, thereby increasing overall throughput and decreasing latency in the TCP connection.

Further, disabling the user of layer 2 acknowledgments and subsequently the need to retransmit dropped packets over the wireless connection can allow BBR to more accurately estimate a round-trip time. Specifically, BBR does not need to take into account retransmission of dropped packets in the wireless connection when estimating a round-trip time. In turn, BBR can control packet transmission based on a more accurate round-trip time estimation, e.g. a decreased round-trip time estimation, which can further decrease latency and increase throughput across the TCP connection.

Additionally, disabling the use of layer 2 acknowledgments reduces or otherwise eliminates an amount of bandwidth over the wireless connection used to transmit the layer 2 acknowledgments. Accordingly, an amount of available bandwidth over the wireless connection is increased, allowing for transmission of even more data, e.g. TCP payload data, across the wireless connection. This can further increase throughput in the overall TCP connection.

Returning back to the timing diagram shown in FIG. 5, at 510, the station 402 can send a layer 4 acknowledgment back to the endpoint 406 through the access point 404. More specifically, the layer 4 acknowledgment can be sent from the station 402 to the endpoint 406 as part of the BBR congestion control mechanism. Layer 4 acknowledgements can still be allowed while the layer 2 acknowledgments over the wireless connection are suppressed or eliminated. Further, data can still be sent from either or both the station 402 and the endpoint 406 independent from receipt of layer 4 acknowledgements, in according with BBR congestion control.

In wireless connections, either or both endpoints in a wireless connection estimate bit rates to transmit data at over the wireless connection and subsequently transmit data at the estimated bit rates over the wireless connection. This is typically done using bit rate probing based on layer 2 acknowledgements transmitted over a wireless connection for data transmitted over the wireless connection. In order to estimate a bit rate for transmitting data over the wireless connection, the control mechanism-based wireless traffic control system 408 can be configured to intermittently allow transmission of layer 2 acknowledgements. Specifically, the control mechanism-based wireless traffic control system 408 can intermittently disable acknowledgement suppression to allow transmission of layer 4 packets across the wireless connection for purposes of estimating a bit rate as part of bit rate probing.

Bit rate estimation through bit rate probing is represented by associated transmissions 512. Specifically, at 514, a data packet is sent from the endpoint 406 to the access point 404. The control mechanism-based wireless traffic control system 408 can disable acknowledgement suppression for the packet transmitted at 514, and the access point 404 can subsequently transmit the data packet to the station 402 at 516. Specifically, the access point 404 can transmit the data packet to the station 402 at a rate above an increased transmission bit rate used by the access point 404 to transmit data to the station 402. The station 402 can then send back a layer 2 acknowledgment for the packet at 518 after it is received. If the acknowledgement is received at the access point 404 at the increased transmission bit rate, then the access point 404 can identify that the increased transmission bit rate is suitable for transmitting packets over the wireless connection and estimate the bit rate based on the increased transmission bit rate. Further, at 524, the station 402 can transmit a layer 4 acknowledgement, e.g. TCP acknowledgement, back to the endpoint 406 indicating the packet transmitted from the endpoint at 514 was received at the station 402. This transmission can be sent as part of the TCP connection and the BBR control mechanism can subsequently send additional packets to the access point 404 irrespective of receipt of the acknowledgement packet at 524.

Alternatively, the control mechanism-based wireless traffic control system 408 can estimate a bit rate for the wireless connection of the TCP connection based on characteristics of one or more flows separate from the TCP connection. In particular, the control mechanism-based wireless traffic control system 408 can estimate a bit rate based on one or more flows separate from the TCP connection while acknowledgment suppression is still enabled, at least in part, across the wireless connection. Characteristics of the one or more flows separate from the TCP connection can include applicable characteristics capable of being used to estimate a bit rate for the wireless connection. For example, characteristics of one or more separate flows separate from a TCP flow can include bit rates at which data is transferred in the one or more flows separate from the TCP flow.

The control mechanism-based wireless traffic control system 408 can use an estimated bit rate to resume sending data over the wireless connection as part of the TCP connection. Specifically, the access point 404 can receive a data packet from the endpoint 406 at 526. The access point 404 can subsequently transmit the data packet to the station at 528 according to the estimated bit rate. In particular, the control mechanism-based wireless traffic control system 408 can transmit the data packet at 528 with acknowledgment suppression enabled. As discussed previously, this can reduce latency and improve throughput over the TCP connection.

FIG. 6 illustrates a flowchart for an example method of controlling traffic to reduce acknowledgement transmission in a TCP connection based on the use of a loss insensitive control mechanism to manage the TCP connection. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

Each module shown in FIG. 6 represents one or more steps, processes, methods or routines in the method. For the sake of clarity and explanation purposes, the modules in FIG. 6 are described with reference to the environments 400 and 500 shown in FIGS. 4 and 5.

At step 600, the control mechanism-based wireless traffic control system 408 analyzes packet arrival times for one or more TCP packets associated with a TCP connection one or more networks. The control mechanism-based wireless traffic control system 408 can analyze packet arrival times of packets received at the access point 404 from the endpoint 406. Alternative, the control mechanism-based wireless traffic control system 408 can analyze packet arrival times of packets received at the access point 404 from the station 402.

At step 602, the control mechanism-based wireless traffic control system 408 determined whether the packet arrival times are constantly spaced over a period of time based on the analyses. Specifically, the control mechanism-based wireless traffic control system 408 can determine whether different subsets of packets are transmitted at corresponding spaced intervals. For example, the control mechanism-based wireless traffic control system 408 can determine the packets transmitted at 414 and 416 are transmitted at a first spaced interval, e.g. half an estimated round-trip time, and the packets transmitted at 420 are transmitted at a second spaced interval, e.g. a quarter of an estimated round-trip time.

At step 604, the control mechanism-based wireless traffic control system 408 identifies whether a TCP control mechanism for the one or more TCP packets is loss insensitive based on whether the packet arrival times are constantly spaced over the period of time. Specifically, the control mechanism-based wireless traffic control system 408 can identify that the TCP control mechanism is loss insensitive if it is determined that the packet arrival times are constantly spaced over a period of time. More specifically, the control mechanism-based wireless traffic control system 408 can determine that the TCP connection is controlled by a BBR control mechanism if the packet arrival times are constantly spaced over a period of time.

At step 606, the control mechanism-based wireless traffic control system 408 reduces a total number of acknowledgement packets transmitted during the TCP connection and associated with transmission of the TCP packets if it is determined that the TCP mechanism is loss insensitive. Specifically, the control mechanism-based wireless traffic control system 408 can reduce a number of acknowledgments sent over a wireless connection of the TCP connection to reduce the total number of acknowledgment packets transmitted during the TCP connection. More specifically, the control mechanism-based wireless traffic control system 408 can enable acknowledgment suppression in layer 2 packets transmitted over a wireless connection of the TCP connection to reduce the total number of acknowledgment packets transmitted during the TCP connection.

Alternatively, the control mechanism-based wireless traffic control system 408 can identify that the TCP connection is controlled by a loss sensitive congestion control mechanism. Specifically, the control mechanism-based wireless traffic control system 408 can identify that the TCP connection is controlled by a loss sensitive congestion control mechanism based on whether the packet arrival times are constantly spaced over the period of time. In response to determining that the TCP connection is controlled by a loss sensitive mechanism, the control mechanism-based wireless traffic control system 408 can abstain from reducing the total number of acknowledgment packets transmitted during the TCP connection.

The disclosure now turns to FIGS. 7 and 8, which illustrate example network devices and computing devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method for managing latency on one or more networks comprising:
    analyzing packet arrival times for one or more transmission control protocol (TCP) packets associated with a TCP connection;
    based on the analysis, determining whether the packet arrival times are constantly spaced over a period of time;
    identifying whether a TCP control mechanism for the one or more TCP packets on the one or more networks is a loss insensitive congestion control mechanism based on whether the packet arrival times are constantly spaced over the period of time, wherein the loss insensitive congestion control mechanism controls data transmission over the TCP connection based on actual congestion in the TCP connection absent packet loss in the TCP connection; and
    reducing a total number of acknowledgement packets transmitted during the TCP connection and associated with transmission of the one or more TCP packets in the TCP connection if it is determined that the TCP control mechanism is the loss insensitive congestion control mechanism.

2. The method of claim 1, wherein the total number of acknowledgement packets transmitted during the TCP connection is reduced with respect to all layer 2 and layer 4 acknowledgement packets being transmitted in response to transmission of the one or more TCP packets during the TCP connection.

3. The method of claim 1, wherein determining that the packet arrival times are constantly spaced over a period of time comprises determining that the one or more TCP packets are paced at a rate calculated irrespective of packet loss and based on at least one of a bandwidth and a round-trip time associated with one or more transmitted TCP packets in the TCP connection.

4. The method of claim 1, wherein the TCP control mechanism is a BBR control mechanism and the method further comprises identifying that the TCP control mechanism is the loss insensitive congestion control mechanism based on whether the packet arrival times are constantly spaced over the period of time.

5. The method of claim 1, wherein the TCP connection is formed over both a WiFi connection and a wired connection.

6. The method of claim 5, wherein whether the TCP control mechanism is the loss insensitive congestion control mechanism is determined based on packets of the one or more TCP packets transmitted over the wired connection between a client and a server.

7. The method of claim 6, wherein whether the TCP control mechanism is the loss insensitive congestion control mechanism is determined based on the packets of the one or more TCP packets received over the wired connection from the server and then transmitted over the WiFi connection to the client.

8. The method of claim 5, further comprising activating acknowledgment suppression to stop transmission of at least a portion of layer 2 acknowledgment packets over the WiFi connection in response to transmission of the one or more TCP packets over the WiFi connection as part of the TCP connection to reduce the total number of acknowledgement packets transmitted through the TCP connection.

9. The method of claim 8, wherein the acknowledgement suppression is activated for packets received over the wired connection and transmitted over the WiFi connection to reduce the total number of acknowledgement packets transmitted during the TCP connection.

10. The method of claim 8, further comprising allowing transmission of layer 4 acknowledgment packets in response to transmission of the one or more TCP packets in the TCP connection while suppressing transmission of the at least the portion of the layer 2 acknowledgment packets over the WiFi connection.

11. The method of claim 8, further comprising:
    intermittently disabling acknowledgement suppression of layer 2 acknowledgement packets to allow transmission of the at least the portion of layer 2 acknowledgement packets over the WiFi connection in order to intermittently perform bit rate probing for the WiFi connection.

12. The method of claim 11, further comprising:
    increasing a transmission bit rate at which TCP packets of the one or more TCP packets are sent over the WiFi connection;
    identifying from the at least the portion of the layer 2 acknowledgement packets associated with transmission of the TCP packets over the WiFi connection whether the TCP packets are received at a receiver at the bit rate; and increasing a bit rate of the TCP connection over the WiFi connection a threshold amount above the transmission bit rate if it is determined that the TCP packets are received at the receiver at the bit rate as part of the bit rate probing of the WiFi connection.

13. The method of claim 8, further comprising:

identifying characteristics for one or more flows separate from the TCP connection over the WiFi connection; and setting a bit rate of the TCP connection over the WiFi connection based on the characteristics for the one or more flows separate from the TCP connection over the WiFi connection while acknowledgement suppression is activated to stop transmission of the at least the portion of layer 2 acknowledgement packets over the WiFi connection in response to transmission of the one or more TCP packets over the WiFi connection as part of the TCP connection.

14. The method of claim 1, further comprising:

identifying that the control mechanism for the one or more TCP packets is loss sensitive; and based on an identification that the control mechanism for the one or more TCP packets is loss sensitive, abstaining from reducing the total number of acknowledgement packets transmitted during the TCP connection and associated with transmission of the one or more TCP packets in the TCP connection.

15. A system comprising:

one or more processors; and at least one computer-readable storage medium having stored therein instructions which, when executed by the one or more processors, cause the one or more processors to perform operations comprising:

analyzing packet arrival times for one or more transmission control protocol (TCP) packets associated with a TCP connection formed over a wired connection and a WiFi connection over one or more networks;

based on the analysis, determining whether the packet arrival times are constantly spaced over a period of time;

identifying whether a TCP control mechanism for the one or more TCP packets on the one or more networks is a loss insensitive congestion control mechanism based on whether the packet arrival times are constantly spaced over the period of time, wherein the loss insensitive congestion control mechanism controls data transmission over the TCP connection based on actual congestion in the TCP connection absent packet loss in the TCP connection; and reducing a total number of acknowledgement packets transmitted during the TCP connection and associated with transmission of the one or more TCP packets in the TCP connection if it is determined that the TCP control mechanism is the loss insensitive congestion control mechanism.

16. The system of claim 15, wherein the instructions which, when executed by the one or more processors, further cause the one or more processors to perform operations comprising activating acknowledgment suppression to stop transmission of at least a portion of layer 2 acknowledgment packets over the WiFi connection in response to transmission of the one or more TCP packets over the WiFi connection as part of the TCP connection to reduce the total number of acknowledgement packets transmitted through the TCP connection.

17. The system of claim 16, wherein the instructions which, when executed by the one or more processors, further cause the one or more processors to perform operations comprising intermittently disabling acknowledgement suppression of layer 2 acknowledgment packets to allow transmission of the at least the portion of layer 2 acknowledgement packets over the WiFi connection in order to intermittently perform bit rate probing for the WiFi connection.

18. The system of claim 15, wherein the instructions which, when executed by the one or more processors, further cause the one or more processors to perform operations comprising:

identifying that the control mechanism for the one or more TCP packets is loss sensitive; and based on an identification that the control mechanism for the one or more TCP packets is loss sensitive, abstaining from reducing the total number of acknowledgement packets transmitted during the TCP connection and associated with transmission of the one or more TCP packets in the TCP connection.

19. The system of claim 15, wherein the total number of acknowledgement packets transmitted during the TCP connection is reduced with respect to all layer 2 and layer 4 acknowledgement packets being transmitted in response to transmission of the one or more TCP packets during the TCP connection.

20. A non-transitory computer-readable storage medium having stored therein instructions which, when executed by a processor, cause the processor to perform operations comprising:

analyzing packet arrival times for one or more transmission control protocol (TCP) packets associated with a TCP connection in one or more networks;

based on the analysis, determining whether the packet arrival times are constantly spaced over a period of time;

identifying whether a TCP control mechanism for the one or more TCP packets on the one or more networks is a loss insensitive congestion control mechanism based on whether the packet arrival times are constantly spaced over the period of time, wherein the loss insensitive congestion control mechanism controls data transmission over the TCP connection based on actual congestion in the TCP connection absent packet loss in the TCP connection; and reducing a total number of acknowledgement packets transmitted during the TCP connection and associated with transmission of the one or more TCP packets in the TCP connection if it is determined that the TCP control mechanism is the loss insensitive congestion control mechanism.

* * * * *